Aug. 24, 1954   G. D. ANDERS   2,687,309
LEVELING MECHANISM FOR MOBILE SAWS
Filed Dec. 1, 1950   4 Sheets-Sheet 1

Inventor

George D. Anders

By Clarence A. O'Brien
and Harvey B. Jacobson
Attorneys

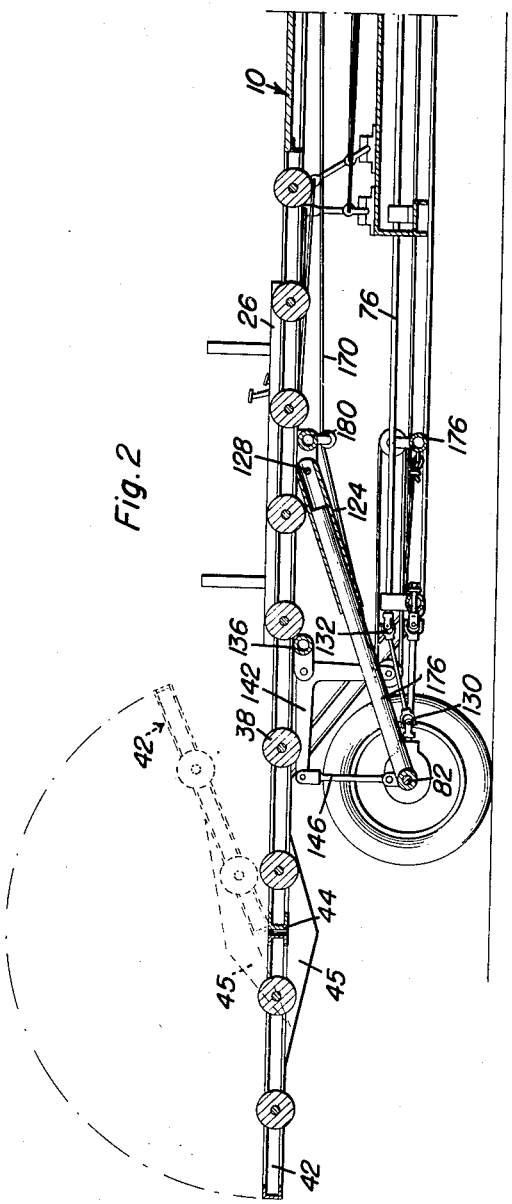

Aug. 24, 1954
G. D. ANDERS
2,687,309
LEVELING MECHANISM FOR MOBILE SAWS
Filed Dec. 1, 1950
4 Sheets-Sheet 3
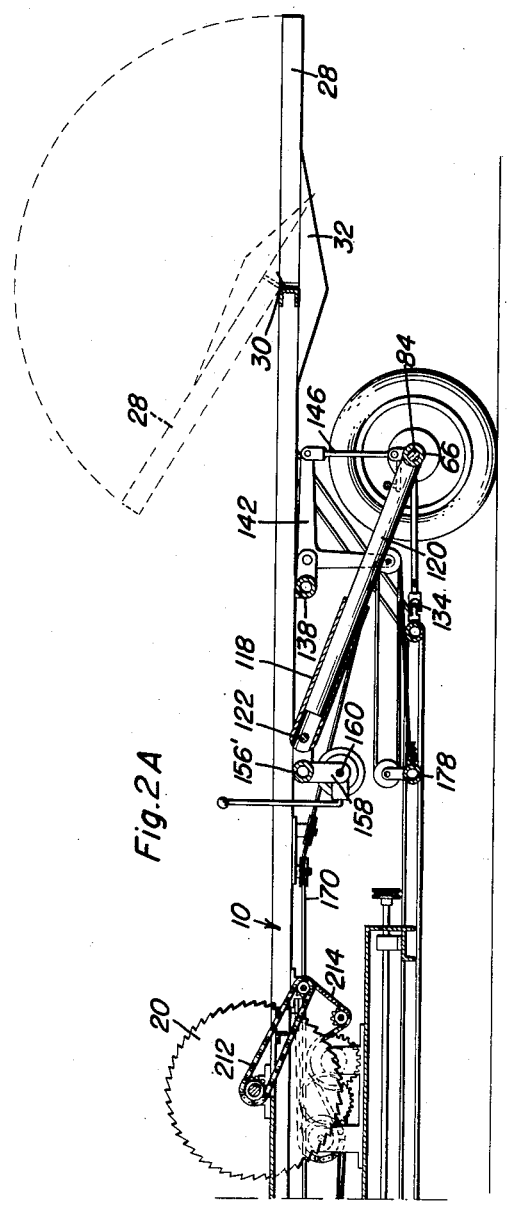
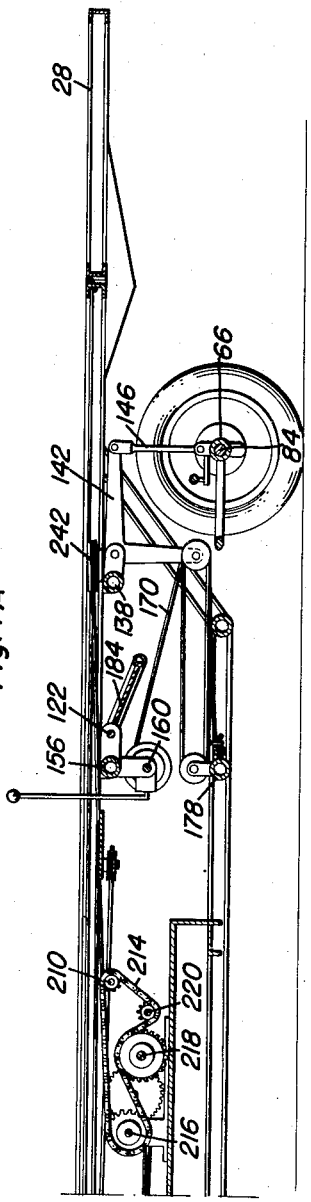
Inventor
*George D. Anders*
By *Clarence A. O'Brien
and Harvey B. Jacobson*
Attorneys Aug. 24, 1954　　　　　G. D. ANDERS　　　　　2,687,309
LEVELING MECHANISM FOR MOBILE SAWS
Filed Dec. 1, 1950　　　　　　　　　　　　　　　4 Sheets-Sheet 4
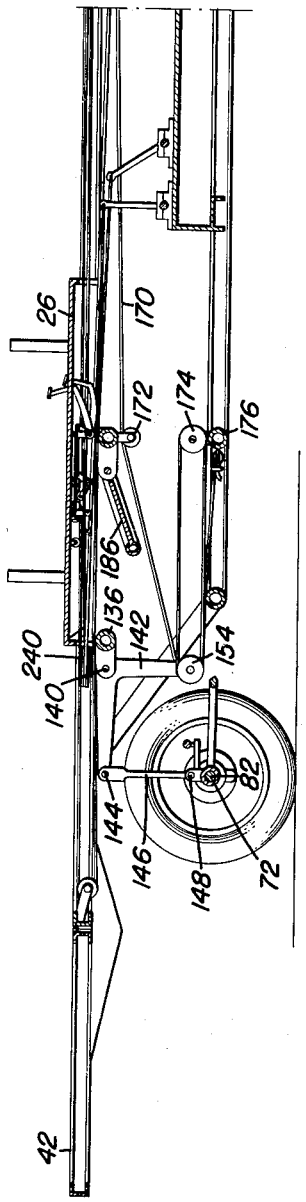
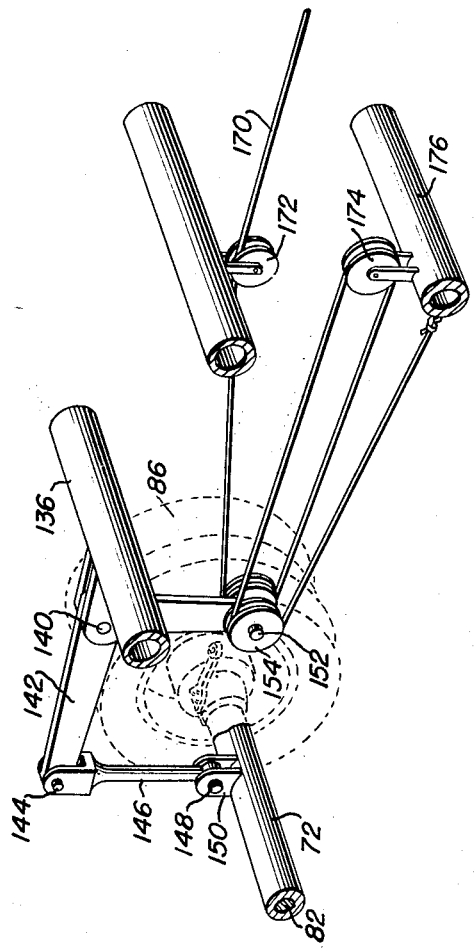
Inventor
*George D. Anders*
By *Clarence A. O'Brien
and Harvey B. Jackson*
Attorneys Patented Aug. 24, 1954

2,687,309

UNITED STATES PATENT OFFICE 2,687,309

LEVELING MECHANISM FOR MOBILE SAWS

George D. Anders, Liberty, Miss.

Application December 1, 1950, Serial No. 198,570

4 Claims. (Cl. 280—6)

This invention comprises novel and useful improvements in a leveling mechanism for mobile saw and more more specifically pertains to an improved sawmill construction mounted upon a mobile supporting frame of an improved and novel construction to facilitate the transportation of the sawmill, particularly over rough terrain, enable the same to be set up in operative position upon a level plane, and facilitate the operation of the sawmill generally.

The principal object of this invention is to provide a mobile sawmill wherein the supporting frame of the sawmill may be easily and satisfactorily leveled with respect to the wheeled supports of the same.

A further object of the invention is to provide an improved mobile sawmill in conformity with the preceding object, in which the levelling of the sawmill may be readily effected from the power plant forming a part of the sawmill through a novel and efficient mechanical operating connection.

These, together with various ancillary features and objects of the invention, which will later become apparent as the following description proceeds, are attained by the present invention, a preferred embodiment of which has been illustrated, by way of example only, in the accompanying drawings, wherein:

Figures 2 and 2a are, respectively, vertical longitudinal sectional views of the rear and front ends of the apparatus, the apparatus being shown in its operative position with the supporting frame in lowered position upon the supporting wheels, alternative positions of certain parts being indicated in dotted lines therein;

Figure 3 is a view similar to Figure 2 but showing the position of the parts when the supporting frame is in its raised position with the supporting wheels in their lowered position;

Figure 1:
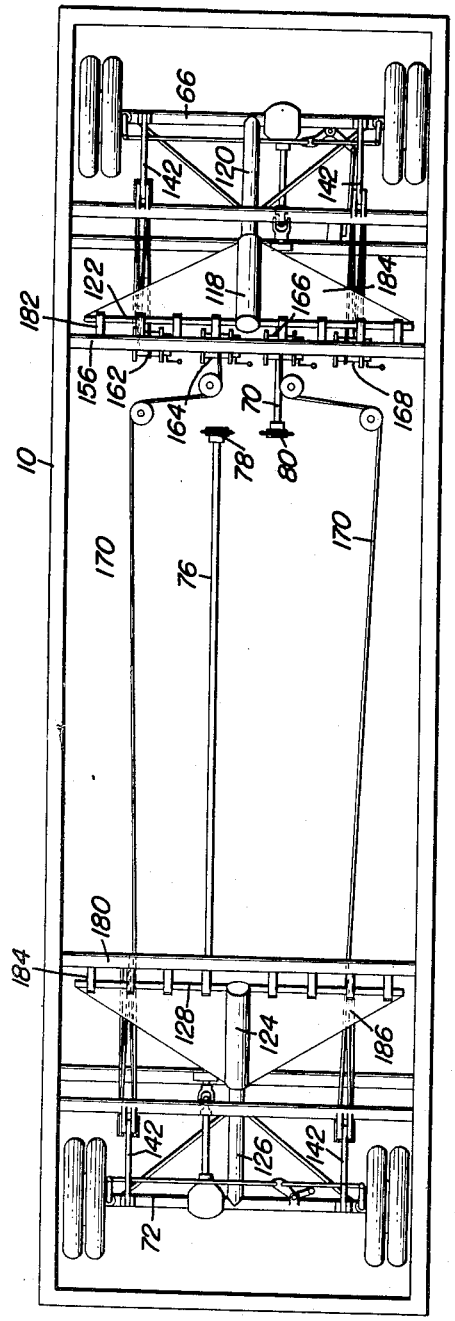
Figure 1 is a top plan view of the chassis or supporting frame of the invention, numerous parts of the sawmill being omitted from the supporting frame.

Figures 4 (sheet 4) and 4a (sheet 3) are, respectively, vertical longitudinal sectional views of the rear and front portions of the device, the supporting frame being shown in its lowered position with the supporting wheels in their raised positions; and, Figure 5 is a perspective detail view, taken upon an enlarged scale, and showing the construction of one of the elevating or leveling means forming a part of this invention.

Reference is now made more specifically to the accompanying drawings, wherein like numerals designate similar parts throughout the various views. In accordance with this invention, the portable sawmill illustrating the principles thereof includes a wheeled, self-propelling chassis which includes a rigid supporting frame of any desired character and indicated generally by the numeral 10.

The front and rear axles of the sawmill are mounted upon the supporting frame of the same in a novel, adjustable manner to be now described. Each of the axles is connected by a pair of telescoping members at substantially the mid points of the axle housings to the sawmill supporting frame substantially upon the longitudinal center of the same. Thus, the front axle housing 66, as shown best in Figure 1, has a cylindrical member 118 telescopingly receiving for both rotation and sliding movement a rod-like inner member 120. The member 120 is integrally or rigidly secured to the axle housing 66, while the cylinder 118 is pivotally secured, as at 122, to a portion of the supporting frame 10. It will thus be seen that the front axle extending transversely below the supporting frame is capable of vertical pivoting movement with respect to the supporting frame, and also is capable of a twisting or tilting movement with respect to the plane of the frame. In a similar manner, the rear axle is attached to the supporting frame by the telescoping members 124 and 126, the latter being secured to the rear axle housing, while the former is pivotally secured, as at 128, to the supporting frame.

It should be observed that the operative connection of the power source to the front and rear axles is unimpaired by the pivotal and angular adjustment of the front and rear axle with respect to the supporting frame, by virtue of the universal joint members 130 and 132 (Figure 2) interposed in the rear axle propeller shaft assembly 76, and the corresponding universal joints 134 (Figure 2a) operatively disposed in the propeller shaft assembly 70 of the front axle housing.

The present invention includes a very important arrangement for leveling the supporting frame with respect to the supporting wheels regardless of the slope of the terrain upon which the device is supported. For this purpose, an elevating means is connected with the supporting frame and with each of the axle housings at the extremities of the latter to individually adjust the distance of the supporting frame with respect to that extremity of the axle housing. Thus, regardless of the inclination of the axle housings, the supporting frame may be positioned and rigidly maintained upon a level plane.

As shown in Figures 2 and 2a, the supporting frame is provided with a pair of rigidly attached, transversely extending beams 136 and 138. Pivoted to these beams, as by pivot pins 140, see also Figure 5, between pairs of lugs integrally carried by the beams, are the mid portions of bellcranks 142. Each bellcrank, at one extremity is pivotally connected, as at 144, to the clevis end of a connecting link 146, whose other end is pivotally connected, as at 148, to pairs of lugs 150 carried by the adjacent end portions of the respective axle housings. The other end of the bellcrank lever has mounted thereon, as by a pivot pin 152, an operating means for the bellcrank which may comprise pairs of pulleys 154. It will now be evident that as the respective bellcranks are operated, by means of their pivot pins 152, they will rock about the fulcrums formed by the pivot pins 142, and thereby raise or lower the supporting frame with respect to the axle housings, as will be seen by comparing the positions shown in Figures 2 and 2a with that shown in Figure 3.

Obviously, various means may be employed to operate the bellcranks individually or, if desired, in unison, and it is to be understood that the principles of this invention are not limited to any particular actuating means. Hydraulic means could readily be employed with suitable hydraulic connections and controls and, likewise, a power operated means in the form of a cable system could be utilized, the latter being illustrated in the present embodiment.

When a cable linkage is employed to operate the bellcranks of the elevating means, the pulleys 154 are utilized. As will be apparent from Figures 1 and 5 particularly, it will be seen that a transversely disposed, rigidly attached frame member 156 supports therebeneath, as by hanger brackets 158, and a supporting shaft 160, a plurality of drums or winches 162, 164, 166 and 168, there being one such drum or winch provided for each of the elevating assemblies. A cable 170 extends from and is connected with each of these winches, and passes over suitable guide pulleys 172 carried by the supporting frame structure in any desired manner, and is entrained over the above-mentioned pair of pulleys 154 upon each of the pivot pins 152 of the bellcranks, over other idler pulleys 174 mounted upon transverse frame members 176 and 178 (Figures 2a and 4a) at the rear and front ends of the supporting frame, and has its other extremity anchored to these transverse members 176 and 178. Thus, as power is applied to rotate the drums in a manner to be subsequently set forth, the cables 170 will be reeled in, thereby causing a pivoting movement of the bellcranks 142 upon their pivot fulcrums 140, to thereby selectively raise or lower the ends of the axle housings with respect to their telescoping supporting members above mentioned.

It will be apparent that as the supporting frame is lowered by unreeling the cables from their drums, the supporting wheels will move outwardly of the supporting frame and upwardly with respect thereto, thereby lengthening the wheel base and lowering the supporting frame. Reversely, when the cables are reeled in, the wheel base will be shortened and the supporting frame will be raised.

It will be further seen that each of the elevating means may be independently operated, thereby tilting the supporting wheels and their axle housings with respect to the supporting frame, whereby the latter may be easily leveled regardless of the slope of the terrain upon which the supporting wheels rest.

It will be readily understood that in lieu of the drums and cables, hydraulic actuating cylinders may be directly connected to the bellcranks of the elevating means for operating the same.

From the foregoing, it is thought that the construction and operation of the invention will be readily apparent, and further explanation is believed to be unnecessary. However, since numerous modifications and changes will readily occur to those skilled in the art after a consideration of the foregoing specification and accompanying drawings, it is not desired to limit the invention to the exact construction shown and described, but all suitable modifications and equivalents may be resorted to, falling within the scope of the appended claims.

Having thus disclosed and described the invention, what is claimed as new is as follows:

1. A leveling construction for a mobile saw mill comprising a supporting frame, transversely disposed front and rear supporting axles for said frame, a combined supporting and leveling means connected to each corner of the frame and to each end of the axles, said last means comprising a bell-crank lever pivoted intermediate its ends upon said frame, one end of said lever being pivoted to an axle at one end thereof, a source of power on said supporting frame, means connecting said source of power to the other end of said lever, a pair of telescoping, relatively slidable and rotatable members connecting each axle to said supporting frame, said telescoping members being connected to said axles and to said frame in the vertical central plane through the same.

2. A leveling construction for a mobile saw mill comprising a supporting frame, transversely disposed front and rear supporting axles for said frame, a combined supporting and leveling means connected to each corner of the frame and to each end of the axles, said last means comprising a bell-crank lever pivoted intermediate its ends upon said frame, one end of said lever being pivoted to an axle at one end thereof, the other end of said lever having pulleys, a source of power on said supporting frame, a cable connecting said source of power to said pulleys, a pair of telescoping, relatively slidable and rotatable members connecting each axle to said supporting frame, said telescoping members being connected to said axles and to said frame in the vertical central plane through the same.

3. A leveling and supporting device for a vehicle comprising a vehicle frame and an axle disposed transversely therebeneath, means rigidly connected to the midportion of said axle and pivotally connected to said frame, a pair of bellcranks each having a midportion pivoted to said frame and each having an end connected to said axle adjacent an end of the latter, a pair of connecting means each connected to the other end of one of said bell cranks, power means operatively connected to each of said connecting means, said first named means comprising concentric rod and tube sections slidably disposed, one of said sections being rigidly secured to said axle and the other of said sections being pivotally connected to said frame.

4. A leveling and supporting device for a vehicle comprising a vehicle frame and axle disposed transversely therebeneath, means rigidly connected to the midportion of said axle and pivotally connected to said frame, a pair of bellcranks each having a midportion pivoted to said frame and each having an end connected to said axle adjacent an end of the latter, a pair of cable and pulley systems each connected to the other end of one of said bellcranks, power means operatively connected to each of said cable and pulley systems, said first named means comprising concentric rod and tube sections slidably disposed, one of said sections being rigidly secured to said axle and the other of said sections being pivotally connected to said frame.

References Cited in the file of this patent

UNITED STATES PATENTS

| Number | Name | Date |
|---|---|---|
| 295,791 | Milne | Mar. 25, 1884 |
| 504,589 | Kaime | Sept. 5, 1893 |
| 656,525 | Dickey | Aug. 21, 1900 |
| 695,194 | Carney | Mar. 11, 1902 |
| 719,585 | Hanssler | Feb. 3, 1903 |
| 778,258 | Martin | Dec. 27, 1904 |
| 919,854 | Gross et al. | Apr. 27, 1909 |
| 980,439 | Risner | Jan. 3, 1911 |
| 1,577,559 | Budd | Mar. 23, 1926 |
| 1,603,821 | Watters | Oct. 19, 1926 |
| 1,791,406 | Foreman et al. | Feb. 3, 1931 |
| 2,000,230 | Heise | May 7, 1935 |
| 2,249,356 | Goodman | July 15, 1941 |
| 2,348,445 | Bayer | May 9, 1944 |
| 2,621,055 | O'Kelley | Dec. 9, 1952 |